United States Patent
Hanimann et al.

(10) Patent No.: US 7,162,879 B2
(45) Date of Patent: Jan. 16, 2007

(54) METHOD AND SYSTEM FOR COOLING FOOD OR FEED PRODUCTS

(75) Inventors: Philipp Hanimann, St. Gallen (CH); Klaus Sohmer, Henau (CH); Dirk-Michael Fleck, Constance (DE)

(73) Assignee: Buhler AG, Uzwil (CH)

( * ) Notice: Subject to any disclaimer, the term of this patent is extended or adjusted under 35 U.S.C. 154(b) by 112 days.

(21) Appl. No.: 10/467,188

(22) PCT Filed: Feb. 4, 2002

(86) PCT No.: PCT/CH02/00059

§ 371 (c)(1),
(2), (4) Date: Jan. 16, 2004

(87) PCT Pub. No.: WO02/062162

PCT Pub. Date: Aug. 15, 2002

(65) Prior Publication Data

US 2004/0112068 A1 Jun. 17, 2004

(30) Foreign Application Priority Data

Feb. 5, 2001 (DE) ................ 101 05 344

(51) Int. Cl.
| | |
|---|---|
| F25D 25/00 | (2006.01) |
| F25D 13/06 | (2006.01) |
| F25D 13/04 | (2006.01) |
| B02C 11/08 | (2006.01) |
| B02C 23/08 | (2006.01) |
| A23L 1/317 | (2006.01) |
| A23K 1/00 | (2006.01) |
| B02B 1/00 | (2006.01) |

(52) U.S. Cl. .................. 62/62; 62/63; 62/65; 241/8; 241/23; 426/518; 426/635

(58) Field of Classification Search ............. 62/62, 62/63, 64, 65; 241/8, 23; 99/517; 426/518, 426/635
See application file for complete search history.

(56) References Cited

U.S. PATENT DOCUMENTS

| | | | | |
|---|---|---|---|---|
| 2,523,552 A | * | 9/1950 | Birdseye | 426/385 |
| 2,609,150 A | * | 9/1952 | Bludeau | 241/15 |
| 2,786,760 A | * | 3/1957 | Bonnafoux | 426/454 |
| 3,289,568 A | * | 12/1966 | Ronning | 99/489 |
| 4,012,535 A | * | 3/1977 | Fiala et al. | 426/658 |
| 4,227,448 A | * | 10/1980 | Ronning | 99/489 |
| 4,786,182 A | | 11/1988 | Larsen | |
| 5,976,594 A | | 11/1999 | LaFollette | |
| 5,987,898 A | * | 11/1999 | Olofsson et al. | 62/63 |
| 6,276,917 B1 | * | 8/2001 | Gutierrez et al. | 425/237 |

FOREIGN PATENT DOCUMENTS

EP 1 023 844 8/2000

(Continued)

*Primary Examiner*—William C. Doerrier
(74) *Attorney, Agent, or Firm*—Merchant & Gould P.C.

(57) ABSTRACT

The invention relates to a method and an installation for cooling bulk products, especially pellets or feed cubes. In order to accelerate possible product replacement, the formed pellets are cooled in two steps, a precooler (3) directly following the forming device (2). A secondary cooling process is only carried out after sifting or breaking and sifting.

3 Claims, 2 Drawing Sheets

FOREIGN PATENT DOCUMENTS

Figure 1:
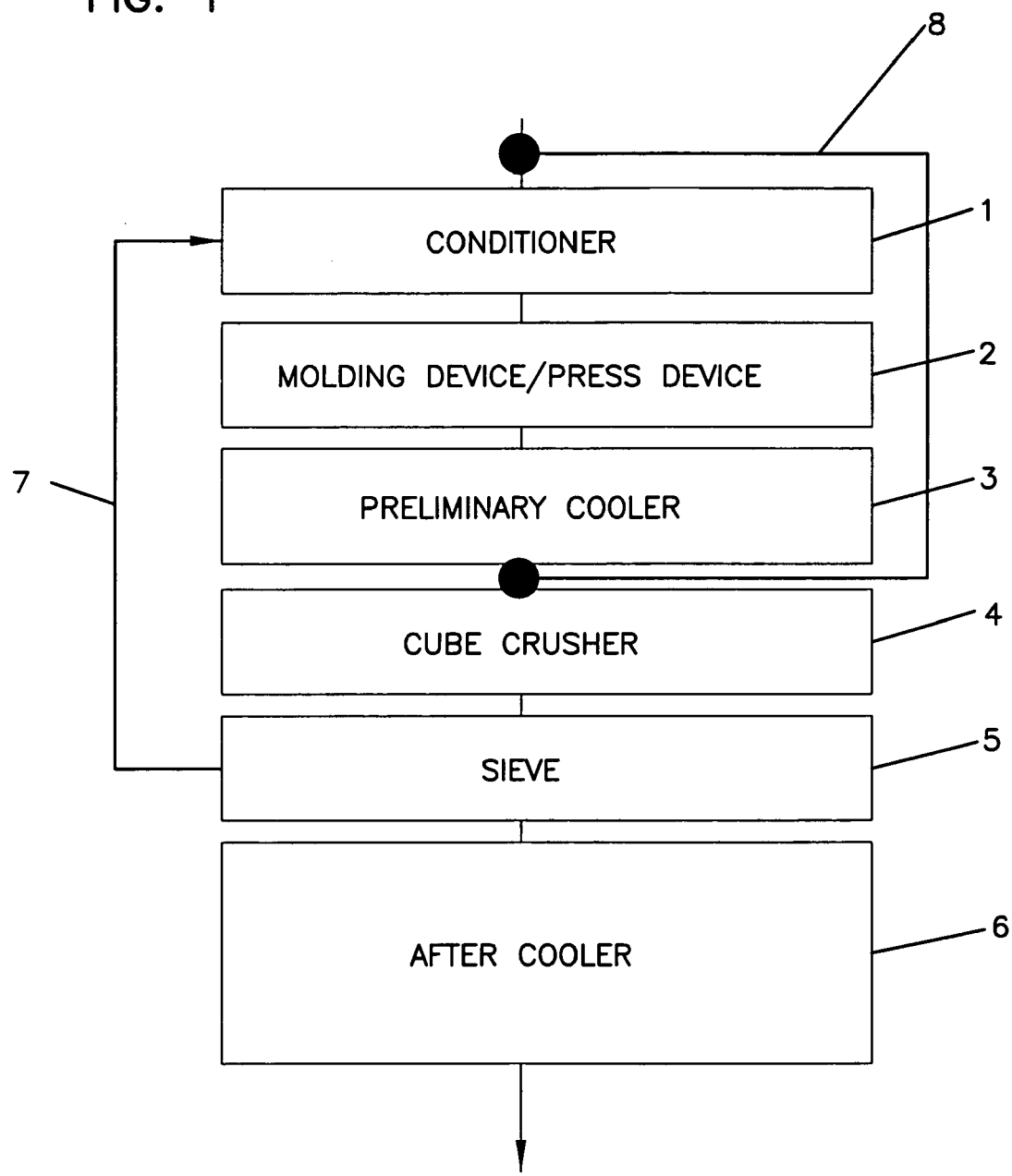

| | | | |
|---|---|---|---|
| GB | 2302816 A * | 2/1997 | |
| GB | 2 322 284 | 8/1998 | |
| JP | 60-237978 | 11/1985 | |
| NL | 9 201 272 | 2/1994 | |
| WO | WO 00/49888 | 8/2000 | |

* cited by examiner

METHOD AND SYSTEM FOR COOLING FOOD OR FEED PRODUCTS

The invention relates to a procedure for cooling pourable products, in particular feed materials, e.g., pellets or feed cubes, and a system for cooling goods like these.

Cooling still warm to hot pellets or feed cubes is sufficiently known as a one-stage procedure. In this case, the pellets are first cooled at temperature gradients that are first high, and then level off, for up to 15–20 minutes. This is followed either by a direct sieving into pellets and fine particles with subsequent sacking or silo storage of the pellets, or by a breaking of pellets and sieving into crumbles and fine particles. The disadvantage to both processes is that the product can only be changed after the entire cooling process has concluded, including the cooling of pellets from returned fines, and the obtained fine product can only be inadequately returned. The accompanying devices essentially consist of a feed cube press or expander system with a feeding and mixing unit and a compression mold, to which is connected a channel to a cooling aggregate, as described in EP-A-610789, for example. Downstream from the cooler are a crushing mill and a sieve device, with a return unit to the mixing and conditioning device.

In a procedure for manufacturing mixed provender according to EP-A-1023844, mixed provender agglomerates that produce little in the way of nauseating odors in the environment are manufactured in such a way that the initial product is first conditioned, then molded, in particular compressed into cubes, and the cooled. In this case, at least one additional temperature reduction step is provided, which enables contact between the process air and feed portions directly after their preparation at a lowered temperature and/or the release of process air into the environment at a lowered temperature, wherein this is to take place without any additional cooling energy. In particular, the process air is intended to prevent odors from being unnecessarily included. For this reason, it is proposed that the feed cubes be partially cooled before coated with additives. In addition, this process air can also be passed through the initial material to preliminarily warm it and condense the odor shares.

In addition, this process air can also be routed through the parent material to preheat it and condense odorous constituents.

For an ensuing coating process, the molded mixed feed can be cooled in a first cooling stage to a temperature of only 60° C. and 35° C., preferably 45° C. The cooling device is complex. Any crushing and sieving of the feed cubes can only take place after exiting the multistage cooling device.

Also known is a method for manufacturing animal feed in which an emulsion containing raw fish is converted into pellets (WO 00/49888). According to the description, the pelleted product comprising several areas is to be dried and cooled before the partially cooled pellets are subsequently sieved, cooled and bagged. According to the only figure for this prior art, the products cooled in the dryer get into a compacter, whose function is not described in any greater detail, but they an also get directly into a following cooler before bagging.

The object of the invention now is to eliminate the disadvantages of known prior art and develop a more effective method for cooling free-flowing products, in particular feedstuffs like pellets or feed cubes, which enables a more rapid product change and the return of more arising fine product after sieving process. The object is achieved with the characterizing features of claim 1. In particular, conditioning and molding is followed by pre-cooling, and then either by a sieving or a crushing and sieving of the products. Only then is the product post-cooled and stored. It was surprisingly discovered that the products are already sufficiently sievable and friable at over room temperature.

Another object is to create a system for cooling such products. Both cooling stages are spatially separated.

The two-stage cooling device previously known from EP-A-1023844 is unable to make obvious or implement the inventive idea, since just using returned process air is not enough to achieve sufficient pre-cooling for pellets or feed cubes to be broken.

Figure 2:
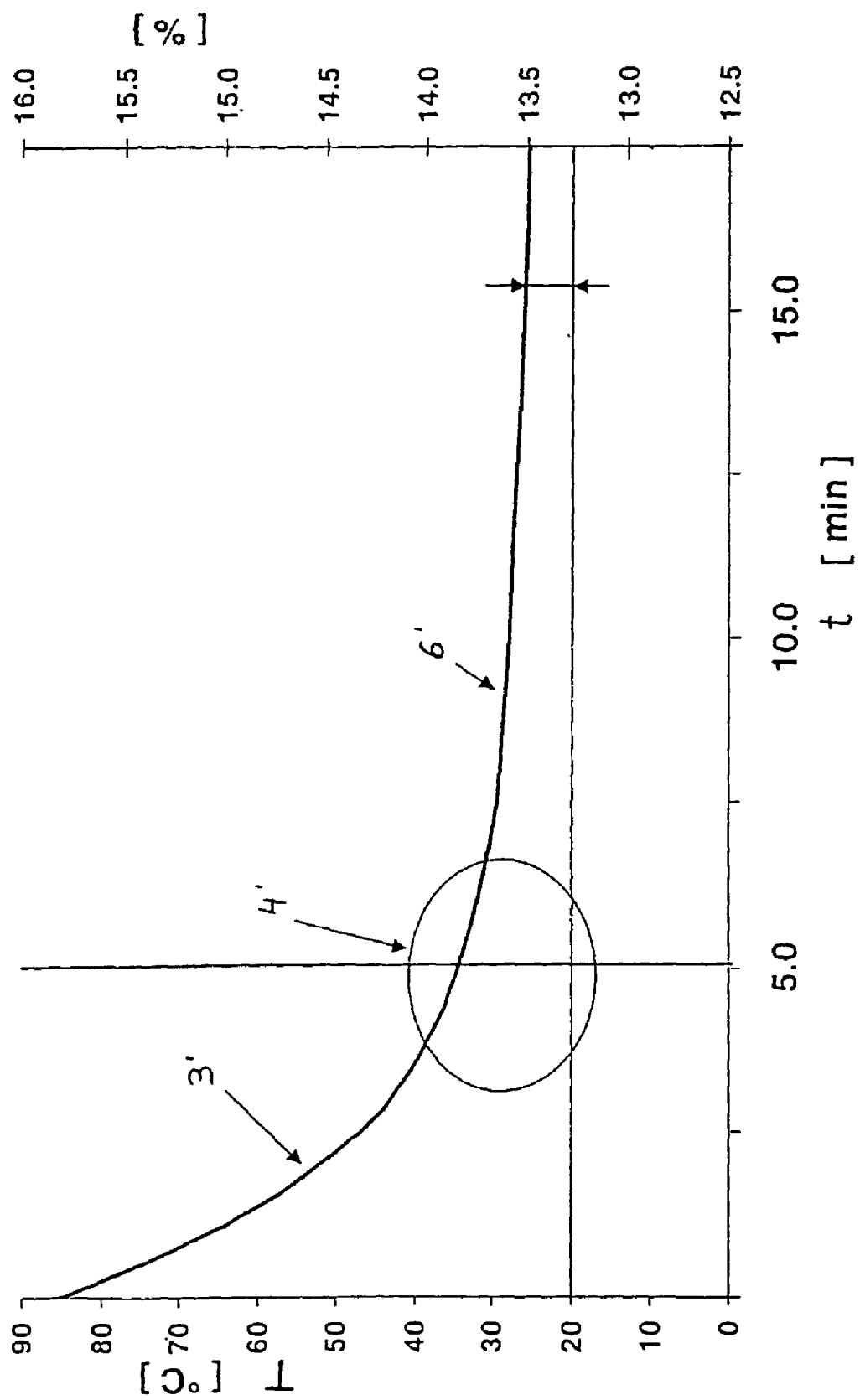

The invention will be described in greater detail below in an exemplary embodiment based on a drawing. The drawing shows:

FIG. 1: A diagrammatic representation of the cooling system;

FIG. 2: A temperature-time diagram of the cooling procedure according to the invention.

A system for manufacturing pellets or feed cubes encompasses a conditioner 1 for the initial products and a molding device 2, for example, as described in EP-A-610789 as a heated feed and mixing device, with a downstream compression mold.

Downstream form the molding device 2 is a preliminary cooler 3, wherein the molding device 2 and preliminary cooler 3 are preferably connected to each other by a channel. Situated directly downstream from the preliminary cooler 3 is either a sieve 5 or crushing mill, e.g., a cube crusher 4 with a roller pair. A sieve 5 is located downstream from the crushing mill 4. The sieve 5 has the usual devices for returning the sifted matter (fine product) to the conditioner 1.

The sieve residues are passed to an aftercooler 6, to which are connected storage devices for the completely cooled pellets.

A conditioned product is pressed into pellets or feed cubes in the molding device 2, and the pellets enter the preliminary cooler 3 at a temperature T of approx. 80° C.–90° C. and a product moisture of approx. 15% (variable depending on climatic conditions and raw product moisture), where they remain for approx. 5 minutes, being cooled to a temperature of less than 40° C. in the process (3'). The temperature T of the preliminarily cooled product can be somewhat higher, depending on the cooling time t and particle or pellet diameter (surface available for evaporation). However, it basically measures less than 60° C. Cooling and drying essentially takes place by evaporating the surface moisture via convective heat and mass transport, which enables a high air throughput.

The product moisture drops to below approx. 13.5%, generally under 14%. The pellets can now already been sufficiently sieved and crumbled (4'), and therefore pass to the cube crusher 4 and then the sieve 5 or directly to the sieve 5.

Sieved fine product is returned to the conditioner 1, and the pellets pass to the aftercooler 6, where they are cooled to nearly room temperature (6') within approx. 10 minutes, and reach a necessary product moisture of less than 13%. During aftercooling, a slower diffusion of moisture from the inside out or heat conduction in the product takes place. The temperature difference is lower than during preliminary cooling, while the retention time of the product in the aftercooler is higher.

Precisely the aftercooling, i.e., balancing a lower temperature difference to the room temperature, requires a higher time outlay than preliminary cooling, and hence requires a long retention time of the product in the cooler during one-stage cooling. A product can only be changed after the last product, i.e., the pellets from returned fines, has left the cooler. In the two-stage cooling according to the invention, the waiting period is reduced to approx. ⅓; as soon as the last pellet has left the preliminary cooler 3, the product can be changed.

After the sieve 5, the product can additionally be sprayed before aftercooling and dried in the aftercooler 6.

The invention claimed is:

1. A method for cooling free-flowing products by mixing, conditioning and pressing or molding the products in pellet form followed by cooling, crushing and sieving these products, wherein cooling takes place in separate stages, wherein the molded products are subjected to pre-cooling in a first stage that takes up only about ⅓ of the entire cooling time, wherein a second cooling stage, post-cooling, takes place after sieving or crushing and sieving the products.

2. A method for cooling free-flowing products by mixing, conditioning and pressing or molding the products in pellet form followed by cooling, crushing and sieving these products, wherein cooling takes place in separate stages, wherein the molded products are subjected to pre-cooling in a first stage that takes up only about ⅓ of the entire cooling time; and wherein the product is sprayed with at least one liquid after sieving.

3. A system for cooling free-flowing products, comprising a mixer and conditioner, a molding device or press mold, a cooler and a crushing and sieving device, wherein the cooler comprises a pre-cooler and a post-cooler spatially separated from it, wherein the pre-cooler is situated after the molding device, and the post-cooler is arranged after the sieve or crushing and sieving device.

* * * * *